United States Patent [19]
Partridge, III

[11] Patent Number: 5,659,335
[45] Date of Patent: Aug. 19, 1997

[54] COMPUTING INTERFACE SYSTEM

[75] Inventor: B. Waring Partridge, III, Far Hills, N.J.

[73] Assignee: Lucent Technologies Inc., Murray Hill, N.J.

[21] Appl. No.: 339,387

[22] Filed: Nov. 14, 1994

[51] Int. Cl.$^6$ ........................................... G09G 5/08
[52] U.S. Cl. ..................... 345/157; 345/163; 345/173
[58] Field of Search ........................ 379/96; 345/173, 345/157, 163

[56] References Cited

U.S. PATENT DOCUMENTS

| | | | |
|---|---|---|---|
| D. 320,197 | 9/1991 | Weber . | |
| 3,879,722 | 4/1975 | Knowlton . | |
| 5,049,863 | 9/1991 | Oka | 340/710 |
| 5,063,376 | 11/1991 | Chang | 345/163 |
| 5,157,381 | 10/1992 | Cheng | 340/710 |
| 5,164,713 | 11/1992 | Bain | 340/710 |
| 5,195,894 | 3/1993 | leBlanc et al. | 434/114 |
| 5,250,929 | 10/1993 | Hoffman et al. | 178/19 |
| 5,268,674 | 12/1993 | Howard et al. | 345/163 |
| 5,280,276 | 1/1994 | Kwok | 345/167 |
| 5,287,090 | 2/1994 | Grant | 345/163 |
| 5,296,871 | 3/1994 | Paley | 345/163 |

FOREIGN PATENT DOCUMENTS

602840A1   6/1994   European Pat. Off. .

OTHER PUBLICATIONS

IBM Technical Disclosure Bulletin, vol. 28, No. 6, 1 Nov. 1985, New York, US, pp. 2648–2649, "Button Interface With Visual Cues".

EP–A–0 487 219 Smiths Industries PLC May 27 1992.

EP–A–0 246 971 Burgain Pierre Eedmond Gabriel; Morel EP Burgain Dominique Blanche, 25 Nov. 1987.

UK Patent Application GB–A–2 131 746 Loke Kar Kohoon 27 Jun. 1984.

Patent Abstracts of Japan, vol. 007 No. 073 P186 (1218), 25 Mar. 1983 * JP–A–58 003020 (Hokushin Denki Seisakush-o:KK) 8 Jan. 1983.

DE–A–37 00913 (Siemens AG) 28 Jul. 1988.

European Search Report Mar. 5, 1996.

*Primary Examiner*—Richard Hjerpe
*Assistant Examiner*—Juliana S. Kim
*Attorney, Agent, or Firm*—Christopher N. Malvone

[57] ABSTRACT

A computing interface system includes a mouse with a keypad, and a computer display that displays a group of icons that have a one-to-one correspondence to the keys composing the mouse's keypad. The icons have the same relative positioning as the keys composing the mouse's keypad. This arrangement permits the user to enter digits into the computer without repeatedly shifting his or her gaze back and forth between the keypad and display.

17 Claims, 3 Drawing Sheets

COMPUTING INTERFACE SYSTEM

CROSS-REFERENCE TO RELATED APPLICATIONS

This application is related to commonly assigned and concurrently filed U.S. patent application Ser. No. 08/239,386 filed Nov. 19, 1994, entitled "Computing and Telecommunications Interface System".

BACKGROUND OF THE INVENTION

1. Field of the Invention

The present invention relates to computers and communications, and more specifically, to a system for interfacing to a computer.

2. Description of the Related Art

In the past when it became necessary to enter numerical information into a computer that used a mouse as an input device, the user had to move his or her hand between the mouse and a keyboard. U.S. Pat. No. 5,063,376, entitled "Numeric Mouse One Hand Controllable Computer Peripheral Pointing Device", presented a partial solution to this problem by providing a mouse with a keypad. Unfortunately, this partial solution resulted in the user repeatedly looking back and forth between the computer's display and the mouse. The user had to monitor the display to verify proper data entry into the computer, and the user had to repeatedly shift his or her gaze to the mouse in order to stay oriented with respect to the keys composing the mouse's keypad.

SUMMARY OF THE INVENTION

An embodiment of the present invention provides a complete solution to the above described problem by displaying a keypad on a computer's monitor so that the keys composing the displayed keypad have a one-to-one correspondence to the keys composing a mouse's keypad. This enables the user to verify data entry into the computer while maintaining orientation with respect to the mouse's keypad, without shifting his or her gaze back and forth between the monitor and the mouse.

In another embodiment of the invention, an icon representative of the entire mouse is displayed on the monitor. The icon includes active regions where the active regions have a one-to-one correspondence to the keys composing the mouse's keypad. When a key is pressed on the mouse's keypad, the corresponding active region changes appearance.

DETAILED DESCRIPTION OF THE INVENTION

Figure 1:
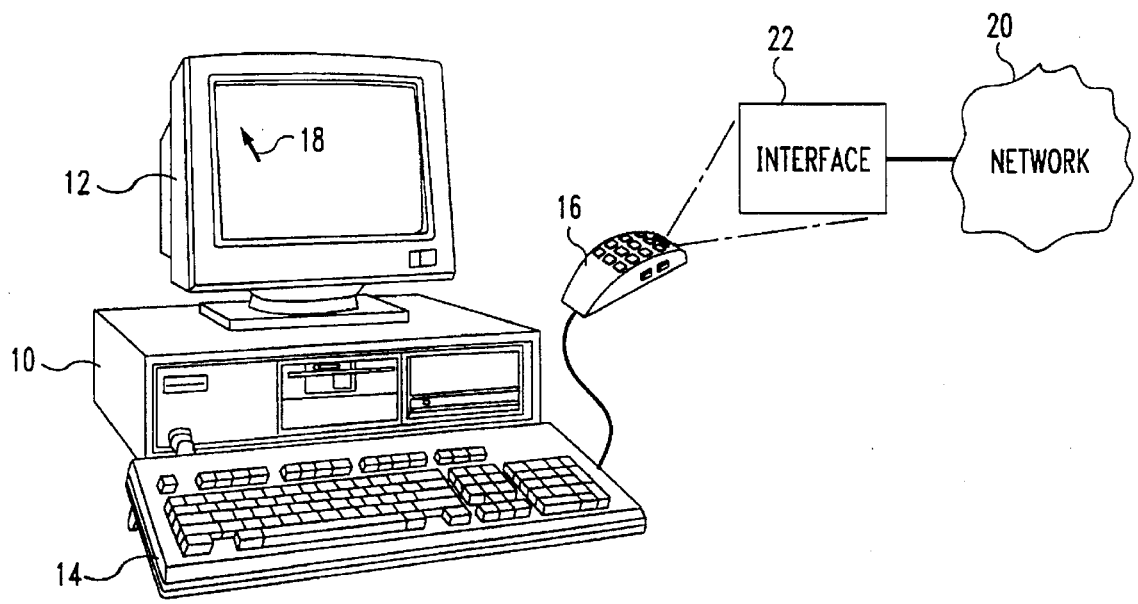
FIG. 1 illustrates a computer, mouse and telephone network.

FIG. 1 illustrates computer 10 which communicates with display 12 and keyboard 14. Mouse 16 is used to control the position of icon 18 that is displayed on display 12, to enter numerical data into computer 10 and to communicate using telephone network 20 through telephone network interface 22. In this embodiment, mouse 16 communicates with computer 10 using a conductor and with telephone network interface 22 using infrared signals.

Figure 2:
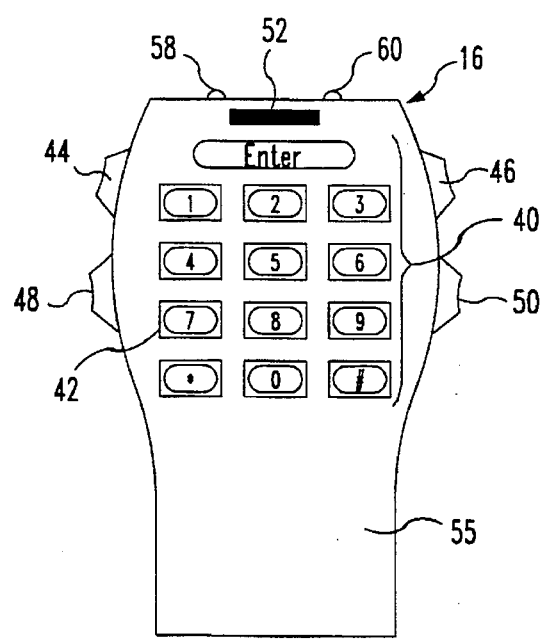
FIG. 2 is a top view of a multifunctional mouse.
Figure 3:
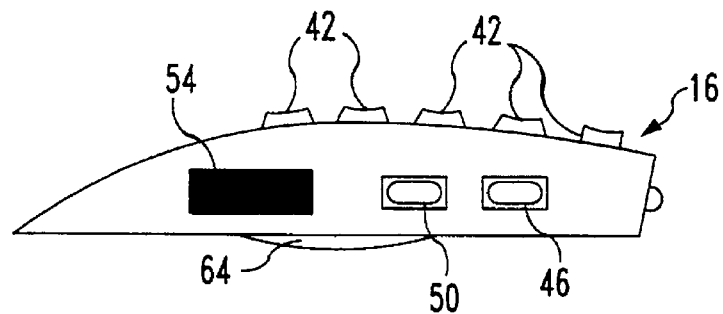
FIG. 3 is a side view of a multifunctional mouse.

FIGS. 2 and 3 are top and side views, respectively, of multifunctional mouse 16. The top surface of multifunctional mouse 16 includes keypad 40 which is composed of user activated switches or keys 42. The keys can be numbered in any particular order; however, it is desirable to have an arrangement of keys 42 similar to that of a typical telephone.

Keys 44 and 46 are used to instruct computer 10 to change the way in which it interprets the activation of keys 42. Computer 10 interprets the activation of switches 42 in two ways depending on the way in which mouse 16 is to be used. If mouse 16 is to be used in a keypad mode, switches 42 are interpreted as a keypad, that is, the activation of keys labeled "1", "2", "3", etc. are interpreted as the digits 1, 2, 3, etc., respectively. If mouse 16 is to be used in a conventional point and click mode, switches 42 are interpreted in the same manner as a conventional mouse, that is, the activation of keys labeled "1", "2" and "3" are interpreted as the left, center and right buttons, respectively, of a conventional mouse. In the point and click mode, the remaining keys of keypad 40 are ignored by computer 10. When mouse 16 is used in the conventional mode, and keys 44 and 46 are pressed simultaneously, computer 10 changes the way in which it interprets keys 42 so that mouse 16 may be used in the keypad mode. When keys 44 and 46 are pressed simultaneously again, computer 10 changes the way in which it interprets keys 42 so that mouse 16 may be used in a conventional point and click mode. It is also possible to switch between the keypad and conventional modes using a single key; however, using two keys helps to prevent accidental switching between modes.

Switches 48 and 50 are used when a user desires to communicate over telephone network 20. Switches or keys 48 and 50 are used to switch from an off-hook to an on-hook condition, or from an on-hook to an off-hook condition. A user switches between off-hook and on-hook conditions by simultaneously pressing keys 48 and 50. For example, to begin a telephone conversation, a user presses keys 48 and 50 to create an off-hook condition and to obtain a dial tone. When a user desires to end a telephone conversation, an on-hook condition is created by once again simultaneously pressing keys 48 and 50. It is also possible to control on-hook and off-hook conditions using only a single key; however, using two keys helps to prevent accidental switching between on-hook and off-hook conditions. A user's voice is transmitted to the telephone network using microphone 52. Microphone 52 is on the top surface of mouse 16; however, the microphone may be placed in any location that permits reception of the user's voice. Speakers 54 are located on the sides of mouse 16. It is also possible to locate one larger speaker on top surface 55 of mouse 16.

Mouse 16 may communicate with computer 10 and network 20 using wired communication links, or wireless communication links. In a wireless embodiment, infrared light emitting diodes (LEDs) may be used for communication; however, it is also possible to use radio frequency communications. In a wireless infrared embodiment, LED 58 is used to communicate with an infrared receiver in computer 10, and LED 60 is used to communicate with an infrared receiver in telephone network interface 22. In order to minimize interference between the communication channels, LEDs 58 and 60 produce different wavelengths of infrared light. For example, LED 58 uses a wavelength to which the receiver in computer 10 is sensitive and the receiver in network interface 22 is insensitive, and LED 60 uses a wavelength to which the receiver in telephone network interface 22 is sensitive and the receiver in computer 10 is insensitive. It is also possible to distinguish between the two communication channels (i.e., the communication channel between the mouse and the computer, and the communication channel between the mouse and telephone network interface) by using coding schemes that permit using the same wavelength for communications with both computer 10 and telephone network interface 22. Using a coding scheme makes it possible to use a single light emitting diode for communications. It is also possible to use a wire or conductor to communicate between mouse 16 and computer 10, and/or between mouse 16 and telephone network interface 22. If a wire is to be used, it is desirable to use a wire for communications between mouse 16 and computer 10 while maintaining a wireless communication channel between mouse 16 and telephone network interface 22.

In reference to FIG. 3, mouse 16 contains ball 64 which is used to sense the motion of the mouse as it is moved across a surface. It is also possible for ball 64 to extend through the top surface of the mouse rather than the lower surface of the mouse. This will enable the mouse to be used as a track ball device in which the user rotates the ball to position an icon in a desirable location on display 12. The track ball embodiment of the invention offers the advantage of controlling the icon on display 12 without moving mouse 16 and thereby saves additional desktop space.

Figure 4:
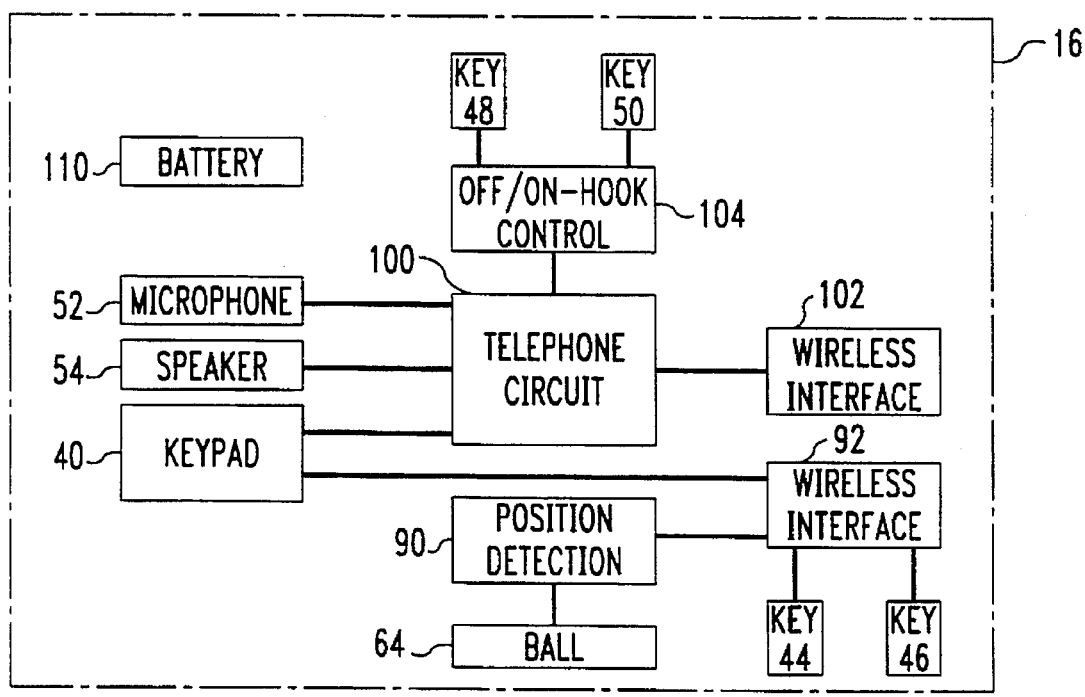
FIG. 4 is a block diagram of a multifunctional mouse.

FIG. 4 is a block diagram of multifunctional mouse 16. Position detection circuitry 90 monitors the motion of ball 64 to produce signals that computer 10 uses to control the position of an icon, such as a pointing icon, on display 12. Position detection circuitry is well-known in the art and uses, for example, rollers in contact with ball 64 so that the rollers rotate when ball 64 rotates as mouse 16 is moved along a surface. The rollers are positioned 90 degrees apart along the circumference of ball 64 so that one roller can detect rotation resulting from moving mouse 16 in the X direction, and the other roller can detect rotation resulting from moving mouse 16 in the Y direction. Each of the rollers is attached to a shaft that rotates a slotted disk, where the shafts are mounted at right angles to each other. The slotted disk interrupts a light beam between a light emitting diode and a photo transistor to create a signal indicative of ball 64's rotation. Computer 10 uses these signals to monitor the X and Y movements of mouse 16 and positions an icon on display 12 in a conventional manner in response to the movements of mouse 16. In the case of a wireless connection between mouse 16 and computer 10, wireless interface 92 converts signals from position detection circuitry 90 into radio frequency or infrared signals that are received by a corresponding receiver in computer 10. These interfaces are well-known in the art and may be similar to, for example, a conventional infrared remote control interface used on a wireless mouse.

Keypad 40, and keys 44 and 46 also communicate with computer 10, and when a wireless interface is used, they communicate via wireless interface 92. When a key is pressed, the identity of that key is passed to computer 10 in a conventional fashion. As mentioned earlier, when both keys 44 and 46 are pressed nearly simultaneously, computer 10 changes the way in which it interprets the inputs from mouse 16. In reference to FIG. 5, it is also possible to instruct computer 10 to interpret the inputs from mouse 16 as keypad inputs rather than conventional mouse inputs by positioning pointing icon 97, which is controlled by mouse 16, into predefined location 98 on display 12. When the icon is positioned within this location on display 12, inputs from mouse 16 are interpreted as keypad inputs rather than simple click and point inputs. It is also possible to control the way in which computer 10 interprets inputs from mouse 16 based on which software application is being executed by the computer.

Keypad 40 is also connected to conventional telephone circuitry 100. Telephone circuitry 100 receives inputs from keypad 40 and microphone 52, and provides an output to speaker 54. Telephone circuitry 100 is well-known in the art and may be used to interface to telephone network 20, in a conventional wired manner using "tip" and "ring" lines. When it is desirable to have a wireless connection between mouse 16 and telephone network 20, wireless interface 102 is used. Wireless interface 102 may be a conventional radio frequency interface such as those used in cordless telephones or it may be an infrared communication interface similar to those used in infrared remote control systems. If a wireless interface is used, the appropriate receiver is used as telephone network interface 22. For example, interface 22 may be similar to a conventional cordless telephone base station when radio frequency communications are used, and interface 22 may be similar to a conventional infrared receiver when infrared communications are used. In addition, telephone circuitry 100 receives inputs from switches 48 and 50 via control 104. As discussed earlier, if an on-hook condition exists, pressing keys 48 and 50 nearly simultaneously will create an off-hook condition. If an off-hook condition exists, pressing keys 48 and 50 nearly simultaneously creates an on-hook condition. Control 104 indicates an off-hook or an on-hook condition to telephone circuitry 100. Control 104 may be implemented using an appropriately programmed microprocessor, or a simple state machine that switches between one of two states when inputs from keys 48 and 50 are detected.

When mouse 16 uses a conductor to communicate with computer 10, electrical power can be provided to mouse 16 via the conductor. If mouse 16 is used in a wireless configuration, battery 110 is used to provide electrical power to the circuitry located in mouse 16. When mouse 16 is used with wireless communications, it is desirable to have a "nest" that is used to charge battery 110 when the mouse is not in use.

Figure 5:
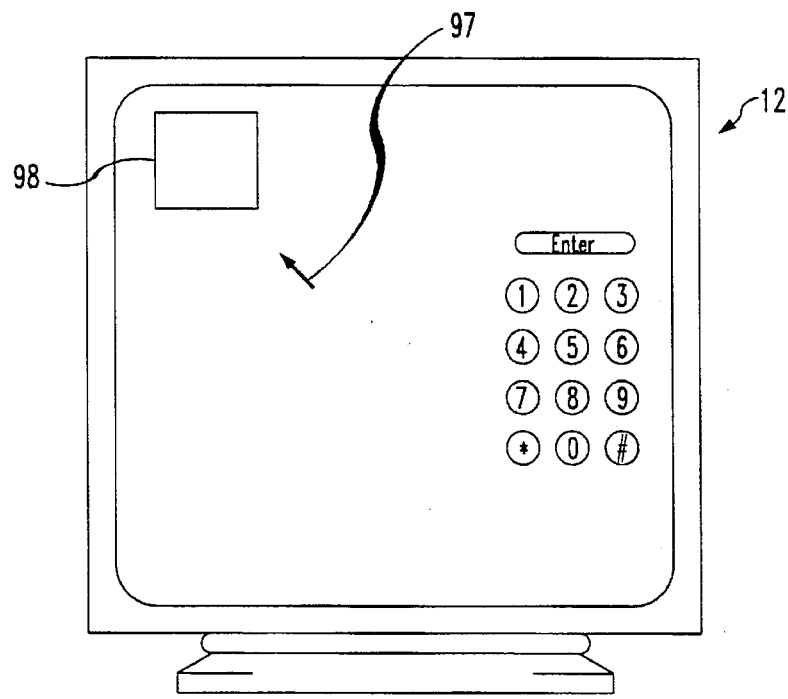
FIG. 5 illustrates a display screen.

In reference to FIG. 5, it is desirable to display on display 12 a plurality of icons representative of keypad 40. In accordance with one of the principles of this invention, the icons are positioned in a manner that is representative of the arrangement of the keys composing keypad 40. This will enable the user to look at display 12 while operating the keys of keypad 40 on mouse 16. The icons representing the keys change appearance when the corresponding key is pressed on mouse 16 to indicate to the user that computer 10 has received a signal indicative of a key being pressed. This provides the user with visual feedback to indicate that the information is being received by computer 10 and also provides the advantage of permitting the user to use keypad 40 without looking back and forth between display 12 and mouse 16. It is also desirable to provide a display that matches the number, identity and configuration of the keys composing keypad 40; this also enables the user to stay oriented with respect to the position of the keys on mouse 16 without repeatedly looking back and forth between display 12 and mouse 16. For example, the icons may have a one-to-one correspondence to the keys composing keypad 40.

Figure 6:
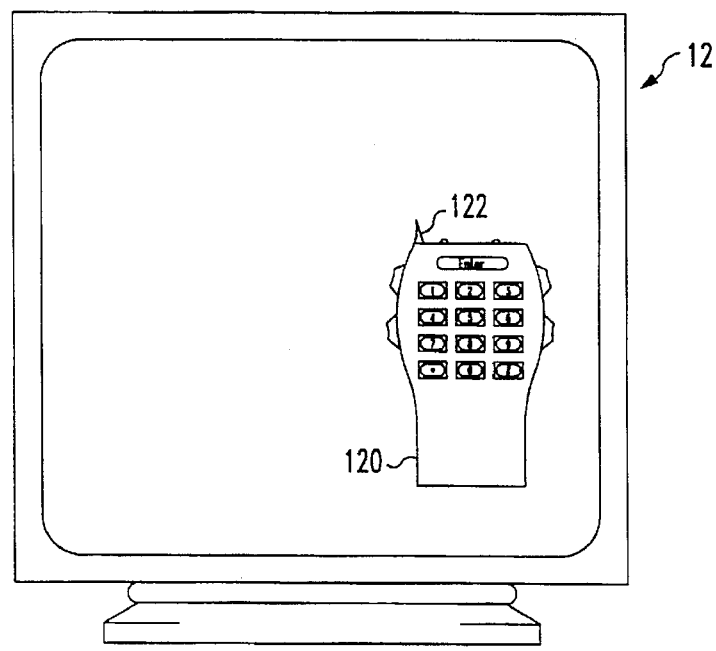
FIG. 6 illustrates a single icon with multiple active regions.

FIG. 6 illustrates single icon 120 which is representative of mouse 16. Icon 120 may be movable in a manner similar to that of a conventional pointing icon, where segment 122 is used as the pointing portion of the icon. If icon 120 is not movable, a conventional pointing icon may be used in addition to icon 120 for providing inputs to the computer. It is desirable for icon 120 to be relatively small with respect to the display screen in order to minimize the display area covered by the icon. Icon 120 includes several active regions that change appearance when the corresponding key of mouse 16 is activated. In this embodiment, active regions are provided for the keys composing keypad 40 and for keys 44, 46, 52 and 54. It is possible to omit active regions corresponding to some or all of keys 44, 46, 52 and 54; however, it is desirable to include an active region corresponding to each key. The additional active regions facilitate keeping the user oriented with respect to the position of the keys on mouse 16 without repeatedly looking back and forth between display 12 and mouse 16.

It should be noted that it is possible to position speaker 50 or microphone 48 in other locations such as in or on computer 10. In this situation, signals between telephone circuitry 100, and the microphone and speaker may be carried over the interface between mouse 16 and computer 10. By placing the speaker and microphone in computer 10, it is possible to reduce the size of mouse 16; however, it may be more desirable to have the speaker and microphone in mouse 16 because of the mobility of mouse 16.

It is also possible to position telephone circuitry 100 within computer 10. In this embodiment, information from keyboard 40 is passed to computer 10 for use by telephone circuitry 100. When the speaker, microphone and telephone circuitry are located in computer 10, telephone circuitry 100 communicates directly with the microphone and speaker. When the speaker and/or microphone are located in mouse 16 and the telephone circuitry is located in computer 10, telephone circuitry 100 communicates with the speaker and/or microphone over the communication channel between computer 10 and mouse 16. Placing telephone circuitry 100 in computer 10 offers the advantage of decreasing the number of communication channels to mouse 16 by eliminating the need for a communication channel that connects directly between mouse 16 and interface 22. In this embodiment, telephone circuitry 100 communicates with interface 22 via a communication channel between computer 10 and interface 22.

What is claimed:

1. A computer interface system including a computer having a display means, comprising:

icon control means for controlling positioning of a pointer icon on the display means, said icon control means having a keypad with a plurality of user activated switches and a plurality of user activated mode setting switches; and means for displaying on said display means at least the pointer icon and a plurality of switch icons representing said plurality of user activated switches, each of said plurality of switch icons having a position relative to each other on the display means that is representative of a positioning of said plurality of user activated switches relative to each other on said icon control means whereby the computer is operative to respond to signals provided by said icon control means and to interpret said plurality of user activated switches in one of a keypad mode and a point and click mode, said icon control means operative to change between said keypad mode and said point and click mode when said plurality of mode setting switches are simultaneously activated by the user.

2. The computer interface system of claim 1 wherein an appearance of an switch icon belonging to said plurality of switch icons changes when a corresponding one of said plurality user activated switches is activated.

3. The computer interface system of claim 1, wherein positioning display of the pointer icon in neighborhood of one of the plurality of switch icons displayed on the display means and activating a preselected one of said switches directs said computer to take action that is prespecified for that one of the plurality of switch icons.

4. The computer interface system of claim 1, wherein said keypad comprises user activated switches corresponding to the digits 0 through 9.

5. The computer interface system of claim 1, wherein said keypad comprises twelve user activated switches arranged in three columns of four switches each.

6. The computer interface system of claim 1, wherein said icon control means is a mouse.

7. A computer interface system, comprising:

icon control means for controlling positioning of a pointer icon on a display means, said icon control means having a keypad with a plurality of user activated switches and a plurality of user activated mode setting switches;

said display means for displaying at least the pointer icon and a control icon representing said icon control means, said control icon having a plurality of active regions representing at least said plurality of user activated switches; and a computer in communication with said icon control means and said display means and operative to interpret said plurality of user activated switches in one of a keypad mode and a point and click mode, said icon control means operative to change between said keypad mode and said point and click mode when said plurality of mode setting switches are simultaneously activated by the user.

8. The computer interface system of claim 7, wherein an appearance of an active region belonging to one of said plurality of active regions changes when a corresponding one of said plurality user activated switches is activated.

9. The computer interface system of claim 7, wherein said plurality of active regions have a positioning relative to each other that is representative of a positioning of said plurality of user activated switches relative to each other.

10. The computer interface system of claim 7, wherein said computer interprets said plurality of user activated switches in one of the keypad mode and the point and click mode when said pointer icon is in a region displaying said control icon and in a remaining one of the keypad mode and the point and click mode when said pointer icon is outside said region.

11. The computer interface system of claim 7, wherein said keypad comprises user activated switches corresponding to the digits 0 through 9.

12. The computer interface system of claim 7, wherein said keypad comprises twelve user activated switches arranged in three columns of four.

13. A computer interface system, comprising:

a mouse operative for controlling positioning of a pointer icon, said mouse having a keypad with a plurality of user activated switches and a plurality of user activated mode setting switches;

display means for displaying at least the pointer icon and an icon representative of said mouse, said icon having a plurality of active regions representing at least said plurality of said user activated switches; and a computer in communication with said mouse and said display means and operative to interpret said plurality of user activated switches in one of a keypad mode and a point and click mode, said mouse operative to change between said keypad mode and said point and click mode when said plurality of mode setting switches are simultaneously activated by the user.

14. The computer interface system of claim 13, wherein an appearance of an active region belonging to said plurality of active regions changes when a corresponding one of said plurality of user activated switches is activated.

15. The computer interface system of claim 13, wherein said plurality of active regions have a position relative to each other that is representative of a positioning of said plurality of user activated switches relative to each other.

16. The computer interface system of claim 13, wherein said computer interprets said plurality of user activated switches in one of the keypad mode and the point and click mode when said icon is in a region displayed by said display and in a remaining one of the keypad mode and the point and click mode when said icon is outside said region.

17. The computer interface system of claim 13, wherein said keypad comprises user activated switches corresponding to the digits 0 through 9.

* * * * *